United States Patent
Lindo et al.

(10) Patent No.: US 11,947,862 B1
(45) Date of Patent: Apr. 2, 2024

(54) STREAMING NATIVE APPLICATION CONTENT TO ARTIFICIAL REALITY DEVICES

(71) Applicant: Meta Platforms Technologies, LLC, Menlo Park, CA (US)

(72) Inventors: Jonathan Lindo, Emerald Hills, CA (US); Agustin Fonts, Santa Clara, CA (US); Michael James Armstrong, Bellevue, WA (US); Nandit Tiku, Sammamish, WA (US); Biju Mathew, San Ramon, CA (US); Rukmani Ravisundaram, Newark, CA (US); Bryce Masatsune Matsumori, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/148,600

(22) Filed: Dec. 30, 2022

(51) Int. Cl.
*G06F 3/14* (2006.01)
*G06F 3/01* (2006.01)

(52) U.S. Cl.
CPC ............ *G06F 3/1454* (2013.01); *G06F 3/011* (2013.01)

(58) Field of Classification Search
CPC ........ H10K 59/00; H10K 59/12; H10K 59/40; H10K 77/111; H10K 2102/311;
(Continued)

(56) References Cited

U.S. PATENT DOCUMENTS

| 770,149 A | 9/1904 | Bailey |
|---|---|---|
| 6,842,175 B1 | 1/2005 | Schmalstieg et al. |

(Continued)

FOREIGN PATENT DOCUMENTS

| EP | 2887322 B1 | 2/2020 |
|---|---|---|
| WO | 2018235371 A1 | 12/2018 |

(Continued)

OTHER PUBLICATIONS

Broitman A., "Learn and Do More with Lens in Google Images," Oct. 25, 2018, Retrieved from the Internet: URL: https://www.blog.google/products/search/learn-and-do-more-lens-google-images/ , 4 pages.

Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

(Continued)

*Primary Examiner* — Ibrahim A Khan
(74) *Attorney, Agent, or Firm* — Potomac Law Group, PLLC; Dannon G. Allbee

(57) ABSTRACT

Aspects of the present disclosure are directed to streaming interactive content from a native application executing at an artificial reality (XR) device into an artificial reality environment and/or to nearby XR device(s). A shell environment at an XR system can manage the software components of the system. The shell environment can include a shell application and a three-dimensional shell XR environment displayed to a user. An additional application, natively executing at the XR system, can provide a host version of content and a remote version of content. A two-dimensional virtual object displayed in the shell XR environment can display the host version of the content, and the remote version of the content can be streamed to a remote XR system. The remote XR system can display the remote content within another two-dimensional virtual object, for example in another shell XR environment displayed by the remote XR system.

20 Claims, 12 Drawing Sheets

(58) Field of Classification Search
CPC .... H10K 59/131; G01D 5/2417; G06F 3/041; G06F 3/0416; G06F 3/044; G06F 2203/04102; G06F 2203/04111; G06F 2203/04112; G06F 3/04166; G06F 3/0445; Y02E 10/549; G09F 9/33; G09F 9/301

See application file for complete search history.

(56) References Cited

U.S. PATENT DOCUMENTS

| | | | |
|---|---|---|---|
| 7,650,575 B2 | 1/2010 | Cummins et al. |
| 7,701,439 B2 | 4/2010 | Hillis et al. |
| 8,335,991 B2 | 12/2012 | Douceur et al. |
| 8,558,759 B1 | 10/2013 | Prada Gomez et al. |
| 8,947,351 B1 | 2/2015 | Noble |
| 9,055,404 B2 | 6/2015 | Setlur et al. |
| 9,081,177 B2 | 7/2015 | Wong et al. |
| 9,117,274 B2 | 8/2015 | Liao et al. |
| 9,292,089 B1 | 3/2016 | Sadek |
| 9,477,368 B1 | 10/2016 | Filip et al. |
| 9,530,252 B2 | 12/2016 | Poulos et al. |
| 9,817,472 B2 | 11/2017 | Lee et al. |
| 10,127,290 B1 | 11/2018 | Armstrong et al. |
| 10,220,303 B1 | 3/2019 | Schmidt et al. |
| 10,248,284 B2 | 4/2019 | Itani et al. |
| 10,473,935 B1 | 11/2019 | Gribetz et al. |
| 10,521,944 B2 | 12/2019 | Sareen et al. |
| 10,713,831 B2* | 7/2020 | Arana | G06T 11/60 |
| 10,867,450 B2 | 12/2020 | Todeschini |
| 10,909,762 B2 | 2/2021 | Karalis et al. |
| 10,963,144 B2 | 3/2021 | Fox et al. |
| 11,023,096 B2 | 6/2021 | Schneider et al. |
| 11,087,029 B1* | 8/2021 | Satpathy | H04L 9/0668 |
| 11,087,529 B2 | 8/2021 | Yeung et al. |
| 11,126,320 B1* | 9/2021 | Thompson | G06F 3/0482 |
| 11,132,066 B1* | 9/2021 | Blachly | G06F 3/017 |
| 11,132,827 B2* | 9/2021 | Gladkov | G06F 3/011 |
| 11,176,755 B1 | 11/2021 | Tichenor et al. |
| 11,238,664 B1 | 2/2022 | Tavakoli et al. |
| 2008/0089587 A1 | 4/2008 | Kim et al. |
| 2009/0313299 A1 | 12/2009 | Bonev et al. |
| 2010/0251177 A1 | 9/2010 | Geppert et al. |
| 2010/0306716 A1 | 12/2010 | Perez |
| 2011/0267265 A1 | 11/2011 | Stinson |
| 2012/0069168 A1 | 3/2012 | Huang et al. |
| 2012/0143358 A1 | 6/2012 | Adams et al. |
| 2012/0188279 A1 | 7/2012 | Demaine |
| 2012/0206345 A1 | 8/2012 | Langridge |
| 2012/0275686 A1 | 11/2012 | Wilson et al. |
| 2012/0293544 A1 | 11/2012 | Miyamoto et al. |
| 2013/0051615 A1 | 2/2013 | Lim et al. |
| 2013/0063345 A1 | 3/2013 | Maeda |
| 2013/0069860 A1 | 3/2013 | Davidson |
| 2013/0117688 A1 | 5/2013 | Yerli |
| 2013/0125066 A1 | 5/2013 | Klein et al. |
| 2013/0141419 A1* | 6/2013 | Mount | G09G 3/003 345/419 |
| 2013/0147793 A1 | 6/2013 | Jeon et al. |
| 2013/0169682 A1 | 7/2013 | Novak et al. |
| 2013/0265220 A1* | 10/2013 | Fleischmann | G06F 3/011 345/156 |
| 2014/0125598 A1 | 5/2014 | Cheng et al. |
| 2014/0149901 A1 | 5/2014 | Hunter |
| 2014/0236996 A1 | 8/2014 | Masuko et al. |
| 2014/0268065 A1 | 9/2014 | Ishikawa et al. |
| 2014/0357366 A1 | 12/2014 | Koganezawa et al. |
| 2014/0375683 A1 | 12/2014 | Salter et al. |
| 2014/0375691 A1 | 12/2014 | Kasahara |
| 2014/0378022 A1 | 12/2014 | Muthyala et al. |
| 2015/0015504 A1 | 1/2015 | Lee et al. |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0077592 A1 | 3/2015 | Fahey |
| 2015/0094142 A1* | 4/2015 | Stafford | A63F 13/212 463/31 |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0253862 A1 | 9/2015 | Seo et al. |
| 2015/0261659 A1 | 9/2015 | Bader et al. |
| 2015/0356774 A1 | 12/2015 | Gal et al. |
| 2016/0026253 A1 | 1/2016 | Bradski et al. |
| 2016/0093108 A1* | 3/2016 | Mao | G02B 27/017 345/633 |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0173359 A1* | 6/2016 | Brenner | A61B 5/02438 709/224 |
| 2016/0180590 A1 | 6/2016 | Kamhi et al. |
| 2016/0378291 A1 | 12/2016 | Pokrzywka |
| 2017/0060230 A1 | 3/2017 | Faaborg et al. |
| 2017/0075420 A1 | 3/2017 | Yu et al. |
| 2017/0076500 A1 | 3/2017 | Maggiore et al. |
| 2017/0109936 A1* | 4/2017 | Powderly | G06F 3/012 |
| 2017/0139478 A1 | 5/2017 | Jeon et al. |
| 2017/0192513 A1 | 7/2017 | Karmon et al. |
| 2017/0206691 A1* | 7/2017 | Harrises | G02B 27/0172 |
| 2017/0242675 A1 | 8/2017 | Deshmukh |
| 2017/0243465 A1 | 8/2017 | Bourne, Jr. et al. |
| 2017/0262063 A1 | 9/2017 | Blenessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0311129 A1 | 10/2017 | Lopez-Uricoechea et al. |
| 2017/0323488 A1 | 11/2017 | Mott et al. |
| 2017/0364198 A1 | 12/2017 | Yoganandan et al. |
| 2017/0372225 A1 | 12/2017 | Foresti |
| 2018/0005429 A1* | 1/2018 | Osman | A63F 13/56 |
| 2018/0059901 A1 | 3/2018 | Gullicksen |
| 2018/0075659 A1* | 3/2018 | Browy | G06F 1/163 |
| 2018/0091304 A1* | 3/2018 | Brook | H04L 9/3066 |
| 2018/0095616 A1* | 4/2018 | Valdivia | H04N 7/142 |
| 2018/0107278 A1 | 4/2018 | Goel et al. |
| 2018/0113599 A1 | 4/2018 | Yin |
| 2018/0189647 A1 | 7/2018 | Calvo et al. |
| 2018/0288391 A1* | 10/2018 | Lee | G06F 3/011 |
| 2018/0300557 A1 | 10/2018 | Rodenas et al. |
| 2018/0307303 A1 | 10/2018 | Powderly et al. |
| 2018/0322701 A1 | 11/2018 | Pahud et al. |
| 2018/0329718 A1* | 11/2018 | Klein | G06F 3/011 |
| 2018/0335925 A1 | 11/2018 | Hsiao et al. |
| 2018/0357780 A1 | 12/2018 | Young et al. |
| 2019/0005724 A1 | 1/2019 | Pahud et al. |
| 2019/0094981 A1 | 3/2019 | Bradski et al. |
| 2019/0107894 A1 | 4/2019 | Hebbalaguppe et al. |
| 2019/0114061 A1 | 4/2019 | Daniels et al. |
| 2019/0155481 A1 | 5/2019 | Diverdi et al. |
| 2019/0172262 A1 | 6/2019 | McHugh et al. |
| 2019/0197785 A1 | 6/2019 | Tate-Gans et al. |
| 2019/0213792 A1* | 7/2019 | Jakubzak | G06F 3/017 |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0279426 A1 | 9/2019 | Musunuri et al. |
| 2019/0286231 A1 | 9/2019 | Burns et al. |
| 2019/0317965 A1 | 10/2019 | Remis et al. |
| 2019/0340833 A1 | 11/2019 | Furtwangler et al. |
| 2019/0362562 A1 | 11/2019 | Benson |
| 2019/0369391 A1 | 12/2019 | Cordesses et al. |
| 2019/0377406 A1 | 12/2019 | Steptoe et al. |
| 2019/0377416 A1 | 12/2019 | Alexander |
| 2020/0066047 A1 | 2/2020 | Karalis et al. |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0174584 A1* | 6/2020 | Schliemann | G06F 3/013 |
| 2020/0210127 A1* | 7/2020 | Browy | H04B 7/155 |
| 2020/0218423 A1 | 7/2020 | Ohashi |

(56) References Cited

U.S. PATENT DOCUMENTS

| | | | |
|---|---|---|---|
| 2020/0219319 A1 | 7/2020 | Lashmar et al. | |
| 2020/0225736 A1 | 7/2020 | Schwarz et al. | |
| 2020/0225758 A1 | 7/2020 | Tang et al. | |
| 2020/0226814 A1 | 7/2020 | Tang et al. | |
| 2020/0285761 A1 | 9/2020 | Buck et al. | |
| 2020/0285977 A1 | 9/2020 | Brebner | |
| 2020/0351273 A1* | 11/2020 | Thomas | H04W 12/06 |
| 2020/0363924 A1 | 11/2020 | Flexman et al. | |
| 2020/0363930 A1 | 11/2020 | Srinivasan et al. | |
| 2021/0012113 A1 | 1/2021 | Petill et al. | |
| 2021/0014408 A1 | 1/2021 | Timonen et al. | |
| 2021/0097768 A1 | 4/2021 | Malia et al. | |
| 2021/0104100 A1* | 4/2021 | Whitney | G06T 19/006 |
| 2021/0192856 A1 | 6/2021 | Lee | |
| 2021/0256769 A1* | 8/2021 | Bailey | G06T 19/006 |
| 2021/0272375 A1 | 9/2021 | Lashmar et al. | |
| 2021/0295602 A1 | 9/2021 | Scapel et al. | |
| 2021/0306238 A1 | 9/2021 | Cheng et al. | |
| 2021/0358201 A1 | 11/2021 | Cady et al. | |
| 2021/0390765 A1 | 12/2021 | Laaksonen et al. | |
| 2022/0084279 A1 | 3/2022 | Lindmeier et al. | |
| 2022/0091722 A1 | 3/2022 | Faulkner et al. | |
| 2022/0101612 A1 | 3/2022 | Palangie et al. | |
| 2022/0121344 A1 | 4/2022 | Pastrana Vicente et al. | |
| 2022/0139052 A1 | 5/2022 | Tavakoli et al. | |
| 2022/0254120 A1* | 8/2022 | Berliner | G06F 1/163 |
| 2022/0269888 A1 | 8/2022 | Stoeva et al. | |
| 2022/0392093 A1* | 12/2022 | Poulad | G06T 7/85 |

FOREIGN PATENT DOCUMENTS

| | | | |
|---|---|---|---|
| WO | 2020226832 A1 | 11/2020 | |
| WO | 2022055822 A1 | 3/2022 | |

OTHER PUBLICATIONS

International Search Report and Written Opinion for International Application No. PCT/US2020/051763, dated Feb. 3, 2021, 11 Pages.

International Search Report and Written Opinion for International Application No. PCT/US2022/032288, dated Sep. 16, 2022, 11 pages.

Invitation to Pay Additional Fees for International Application No. PCT/US2021/044098, dated Nov. 3, 2021, 15 pages.

Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Melnick K., "Google Rolls out New AR Features for Its Lens APP," May 28, 2019, Retrieved from the Internet: URL: https://vrscout.com/news/new-ar-features-google-lens/ , 3 pages.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Schweigert R., et al., "EyePointing: A Gaze-Based Selection Technique," Proceedings of Mensch and Computer, Hamburg, Germany, Sep. 8-11, 2019, pp. 719-723.

"Unity Gets Toolkit for Common AR/VR Interactions," Unity XR interaction Toolkit Preview [Online], Dec. 19, 2019 [Retrieved on Apr. 7, 2020], 1 page, Retrieved from the Internet: URL: http://youtu.be/ZPhv4qmT9EQ.

* cited by examiner

STREAMING NATIVE APPLICATION CONTENT TO ARTIFICIAL REALITY DEVICES

TECHNICAL FIELD

The present disclosure is directed to streaming interactive content from a native application executing at an artificial reality device into an artificial reality environment and/or to nearby artificial reality device(s).

BACKGROUND

Artificial reality systems have grown in popularity and this trend is expected to accelerate. Immersive artificial reality environments can provide unique experiences and support virtual social interactions among users. Some artificial reality systems can immerse users in a shared artificial reality environment that includes a large number of other users. Most artificial reality systems include shell environment from which users can launch applications, such as an application that immerses the user in an artificial reality environment. However, the shell environments of artificial reality systems often provide basic functionality and little to no opportunity for device to device interactions. In addition, conventional shell environments can execute a limited number and variety of applications.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
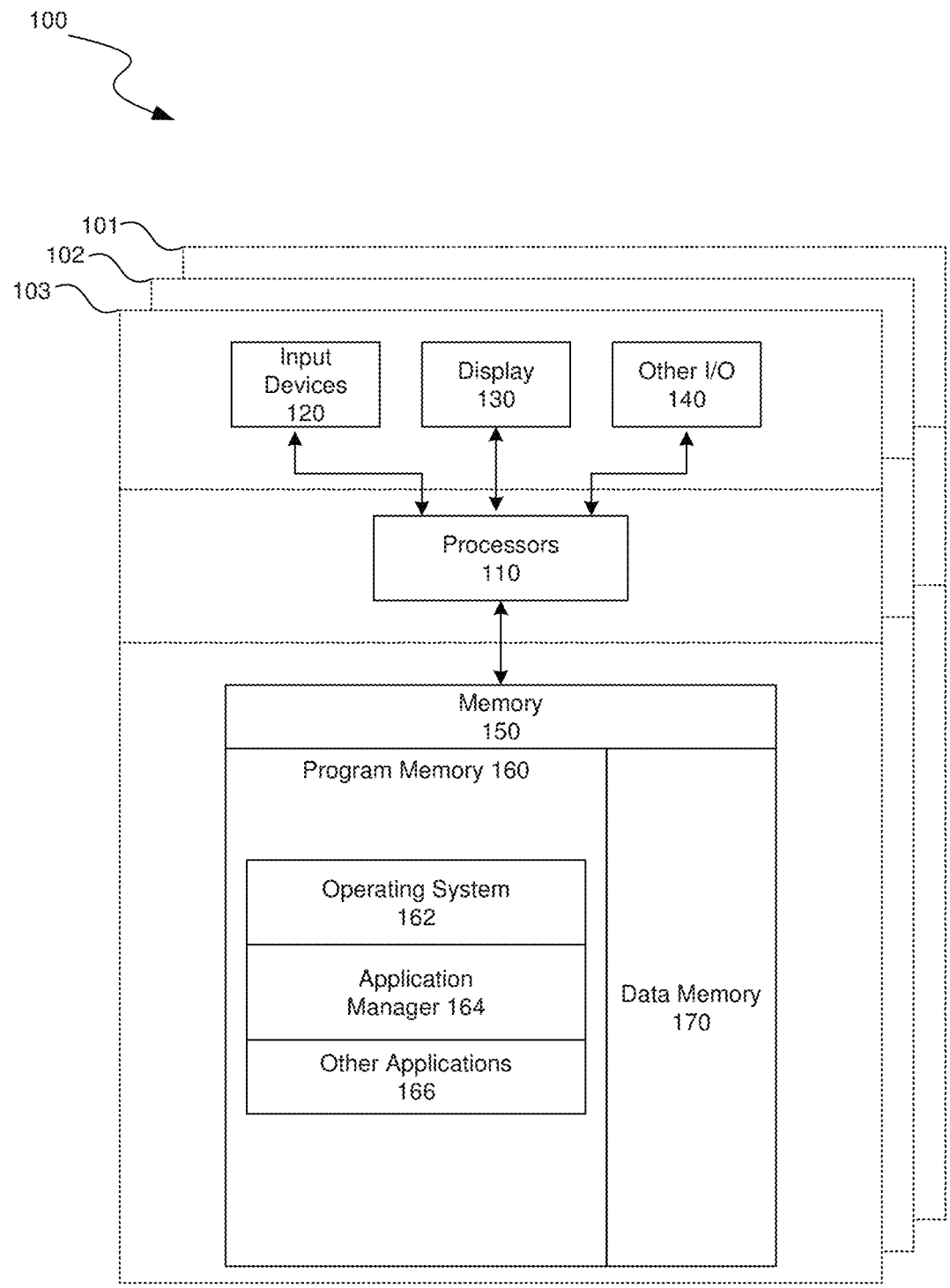
FIG. 1 is a block diagram illustrating an overview of devices on which some implementations of the present technology can operate.

Aspects of the present disclosure are directed to streaming interactive content from a native application executing at an artificial reality device into an artificial reality environment and/or to nearby artificial reality device(s). A shell environment at an artificial reality system can manage the software components of the system, such as system display components, software functionality for system display components, and interactions with additional applications. The shell environment can include a shell application and a three-dimensional shell artificial reality environment displayed to the user of the system. The artificial reality system can host execution of additional applications (e.g., separate from the shell application). An example executing additional application can provide two versions of content: a) a host version for the artificial reality system, and b) a remote version for a remote artificial reality system. For example, a first two-dimensional virtual object displayed in a first shell artificial reality environment can display the host version of the content, and the remote version of the content can be streamed to a remote artificial reality system. The host version of content and remote version of content can include web content, images, video, audio, text, and any other suitable content.

The remote artificial reality system can display the remote content within a second two-dimensional virtual object, for example in a second shell artificial reality environment displayed by the remote artificial reality system. In some implementations, the remote artificial reality system can receive user input relative to the second virtual object and transmit the user input back to the artificial reality system. The additional application executing at the artificial reality system can perform application functionality in response to the received input. Accordingly, implementations display, locally at a host system via a first virtual object, a host version of content from a natively executing application and stream, to a remote system, a remote version of the content from the natively executing application, where the remote system displays the remote version of content via a second virtual object.

In some implementations, a third virtual object displayed at the first shell artificial reality environment of the artificial reality system can also display the remote content. In this example, the first shell artificial reality environment includes two different virtual objects that display different versions of content output by the additional application executing at the artificial reality system.

In some implementations, the artificial reality system can receive user interactions relative to a two-dimensional virtual object and the shell application can translate the interaction into input for the additional application that corresponds to the two-dimensional virtual object. For example, the user interaction can comprise selecting a button at the virtual object (e.g., via driving a cursor, selecting via a ray cast from the user's virtual presence, tracked hand movement, etc.) and performing a button push gesture (e.g., back and forth gesture of the user's hand). The shell application can translate the user interaction into an event at the cursor location, and the additional application can receive this translation and perform application functionality in response (e.g., the functionality triggered by a button press). In another example, implementations of the shell application can detect a collision between a ray cast from a user's hand or a controller of an artificial reality device and a two-dimensional virtual object and translate the input into one or more of a button press event at a two-dimensional coordinate on the two-dimensional virtual object, a scroll event that targets a display component on the two-dimensional virtual object, or any other suitable application event.

In some implementations, input received at the remote artificial reality system (e.g., received and translated via a shell application at the remote artificial reality system) can be transmitted to the artificial reality system. The additional application executing at the artificial reality system can perform functionality in response to the transmitted input. For example, the performed functionality can include: A) altering content hosted by the virtual object (e.g., associated with the executing additional application) displayed at the artificial reality system; B) altering the remote content streamed to the remote artificial reality system and hosted at the virtual object displayed at the remote artificial reality system; C) or any combination therein.

In some implementations, the artificial reality system and the remote artificial reality system establish a connection for streaming the remote content and communicating the user input. The connection can be any suitable device to device connection or connection orchestrated by intermediary server or network components, such as a connection via a wireless network, or any other suitable connection. In some implementations, the artificial reality system and remote artificial reality system are collocated in a physical space.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

The shell component of conventional XR systems is limited and fails to support dynamic functionality for applications executing at the XR systems. For example, shell environments often include rigid operating conditions and do not provide opportunities for natively executing applications to stream content to other XR systems.

Implementations disclosed herein provide enhanced interactions between a shell application, a shell artificial reality environment (shell XR environment), and additional applications that are executing natively at an XR system (e.g., applications separate from the shell application). A natively executing application can provide two or more versions of content: a host version for the XR system, and one or more remote versions for remote XR systems. While the host version can be displayed via a virtual object (e.g., two-dimensional virtual object) at the XR system, the remote version(s) can be streamed to one or more remote XR systems. Each remote XR system can display its remote version of content in a corresponding two-dimensional virtual object (e.g., within a shell XR environment). Accordingly, implementations provide a shell environment that supports enhanced device to device communications for natively executing applications.

In addition, input received via the virtual objects at remote XR systems that display remote version(s) of the application content can be communicated back to the XR system and the additional application executing at the XR system. The additional application can perform application functionality in response to the input. Accordingly, implementations also support interactions between the natively executing application at the XR system and users of remote XR systems.

Several implementations are discussed below in more detail in reference to the figures. FIG. 1 is a block diagram illustrating an overview of devices on which some implementations of the disclosed technology can operate. The devices can comprise hardware components of a computing system 100 that stream interactive content from a native application executing at an artificial reality device into an artificial reality environment and/or to nearby artificial reality device(s). In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, application manager 164, and other application programs 166. Memory 150 can also include data memory 170 that can include, e.g., content for virtual object(s), remote content for virtual object(s), user input data, translated user input data, three-dimensional virtual object data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
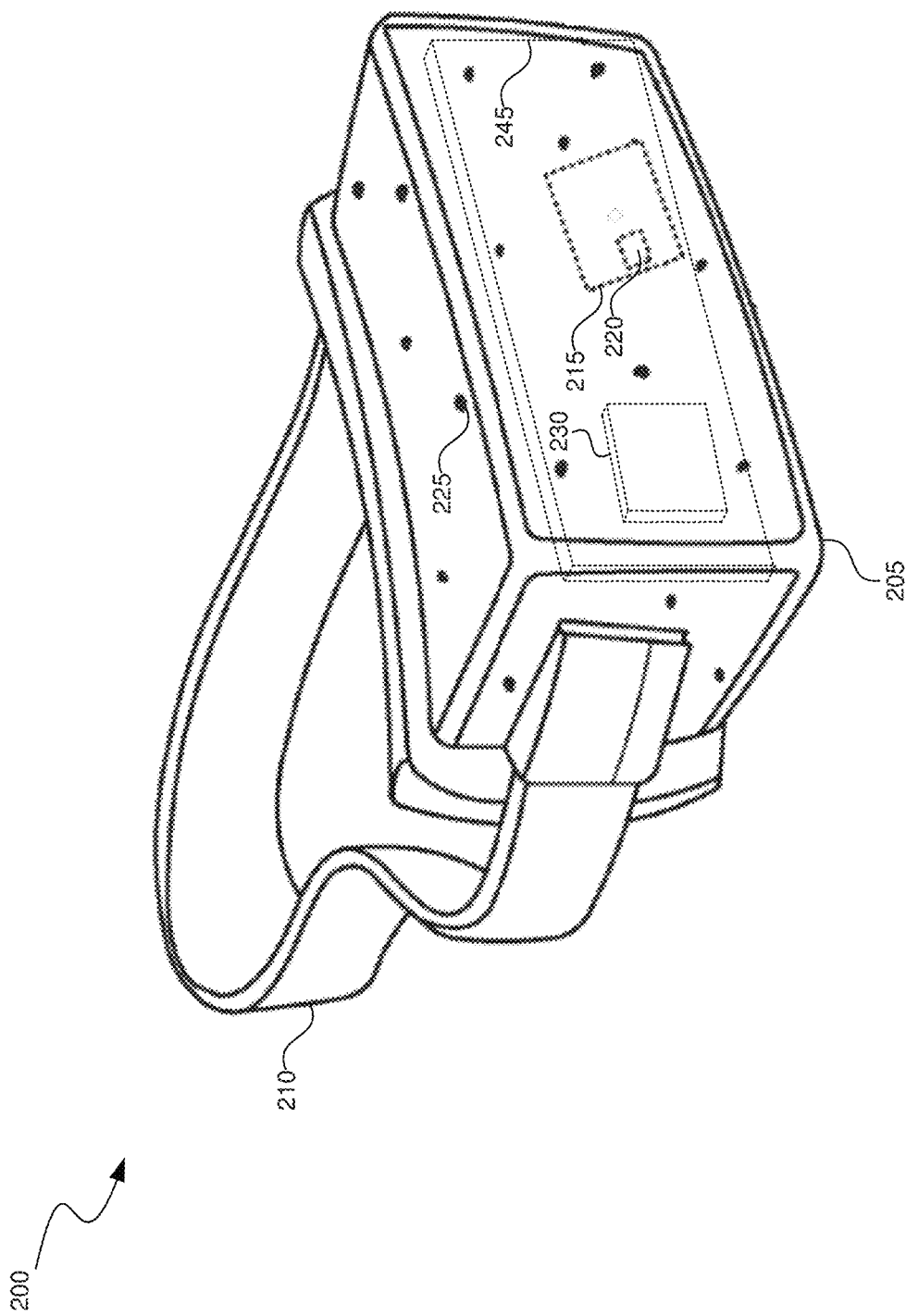
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3 DoF) or six degrees of freedom (6 DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
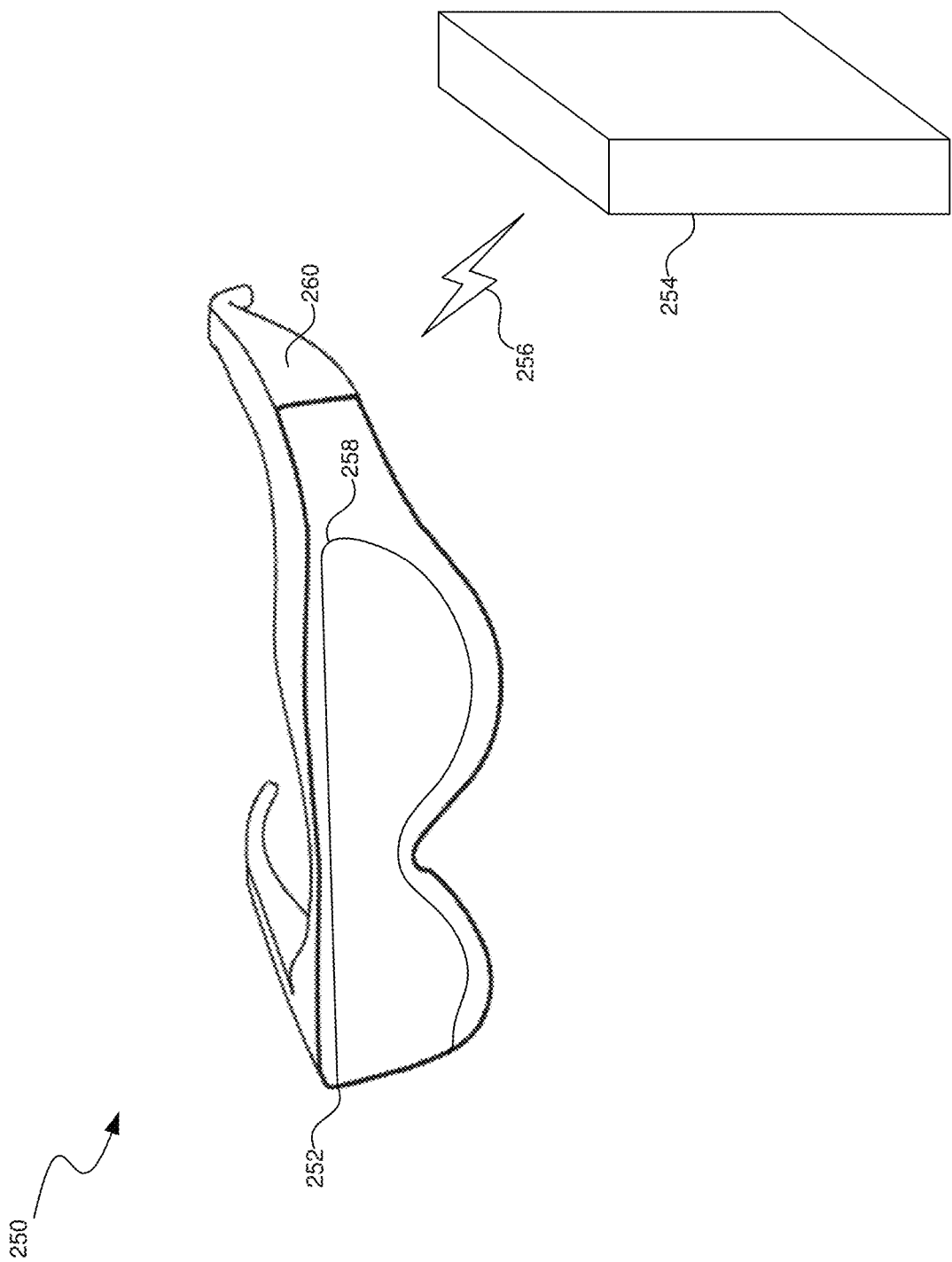
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3 DoF or 6 DoF, track portions of the user (e.g., hands, feet, head, or other body parts), map virtual objects to appear as stationary as the HMD 252 moves, and have virtual objects react to gestures and other real-world objects.

Figure 2C:
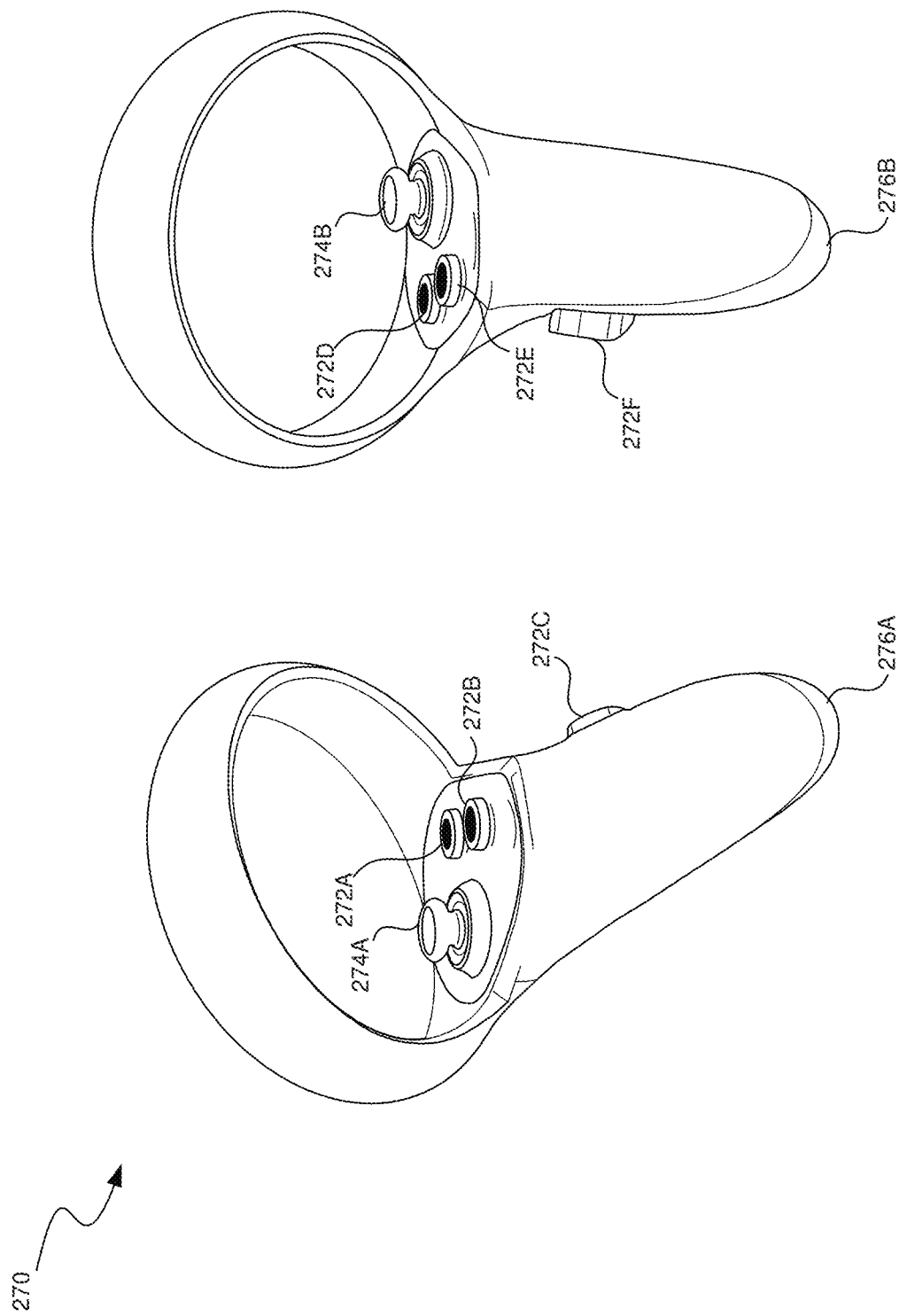
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3 DoF or 6 DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
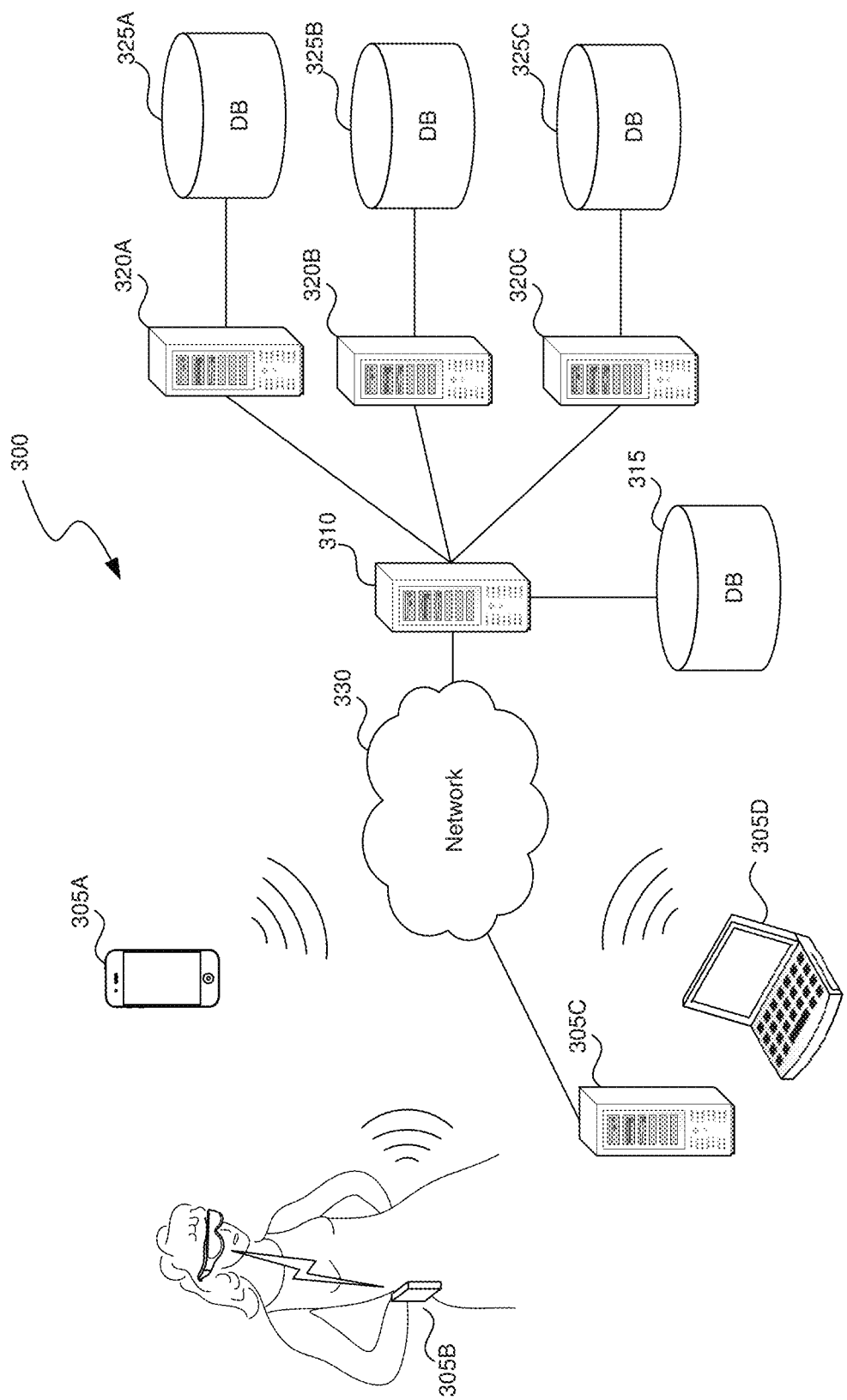
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
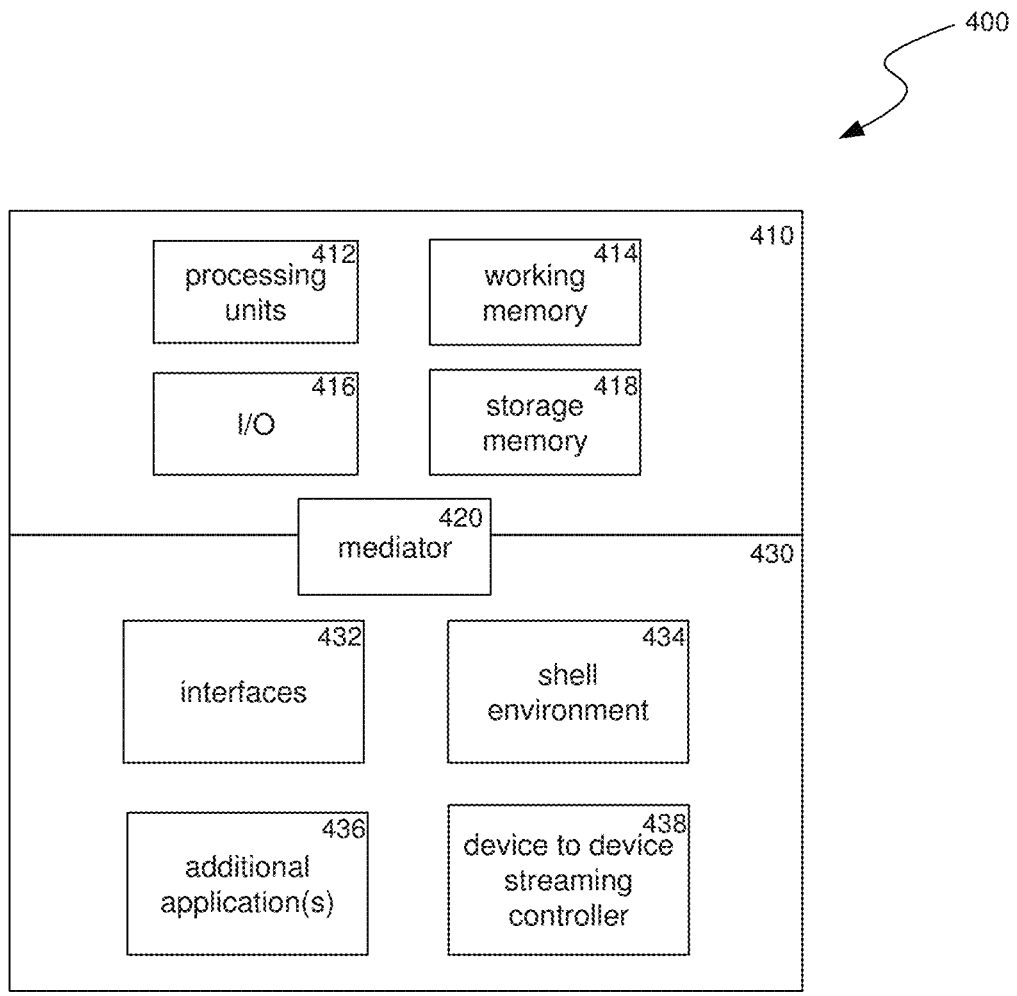
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for streaming interactive content from a native application executing at an artificial reality device to nearby artificial reality device(s). Specialized components 430 can include shell environment 434, additional application(s) 436, device to device streaming controller 438, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Shell environment 434 can manage the software components of a XR system, such as system display components, software functionality for system display components, and interactions with and between additional application(s) 436. Implementations of shell environment 434 can interact with applications executing at the XR system, such as additional applications(s) 436, to manage visual displays for the applications, such as two-dimensional virtual object displays (e.g., panels). Shell environment 434 can manage positioning and sizing of the virtual object displays and allocate portions of display area/volume to the executing applications. In some implementations, shell environment 434 can receive user input (e.g., via one or more components of the XR system) relative to a virtual object associated with an executing application, and translate the user input for the executing application. For example, the executing application can perform application functionality that alters the content displayed at the virtual object in response to the translated user input.

In some implementations, shell environment 434 can provide a shell XR environment, such as a three-dimensional environment, in which the virtual objects are positioned and displayed. Shell environment 434 can comprise a shell application executing at the XR system. In some implementations, shell environment 434 can comprise several units of executing software in combination. Additional details on shell environment 434 are provided below in relation to FIGS. 5, 6, 7, 8, blocks 902, 904, 906, 914, 918, 920, and 922 of FIG. 9, and blocks 1002, 1004, 1006, and 1012 of FIG. 10.

Additional application(s) 436 can comprise applications separate from shell environment 434 that can be executed at a XR system (e.g., executed by a host operating system at the XR system). Example additional application(s) 436 include web browsers, music players, video players, social media applications, messaging web browsers, music players, video players, social media applications, messaging or other communication applications, third-party applications, streaming/casting applications, a content library application, or any other suitable application. Additional details on additional application(s) 436 are provided below in relation to FIGS. 5, 6, 7, 8, and blocks 904, 906, and 912 of FIG. 9, and blocks 1004 and 1006 of FIG. 10.

Device to device streaming controller 438 can stream remote content provided by an application executing at a host XR system to a remote XR system and transmit input for the application received at the remote XR system to the host XR system. For example, an application executing at the host XR system can generate remote content. Device to device streaming controller 438 at the host XR system can stream the remote content from the host XR system to a remote XR system. The streamed remote content can be received by device to device streaming controller 438 at the remote XR system, and a virtual object displayed at the remote XR system (e.g., via shell environment 434 at the remote XR system) can display the remote content.

In some implementations, input received at the remote XR system (e.g., received and translated via shell environment 434 at the remote XR system) can be transmitted by the device to device streaming controller 438 at the remote XR system to the device to device streaming controller 438 at the host XR system. The application executing at the host XR system can perform functionality in response to the transmitted input. For example, the performed functionality can include: A) altering content hosted by a virtual object (e.g., associated with the executing application) displayed at the host XR system; B) altering the remote content streamed to the remote XR system and hosted at the virtual object display at the remote XR system; C) or any combination thereof. Additional details on device to device stream controller 438 are provided below in relation to FIG. 8, and blocks 908, 918, 924, and 910 of FIG. 9.

Figure 5:
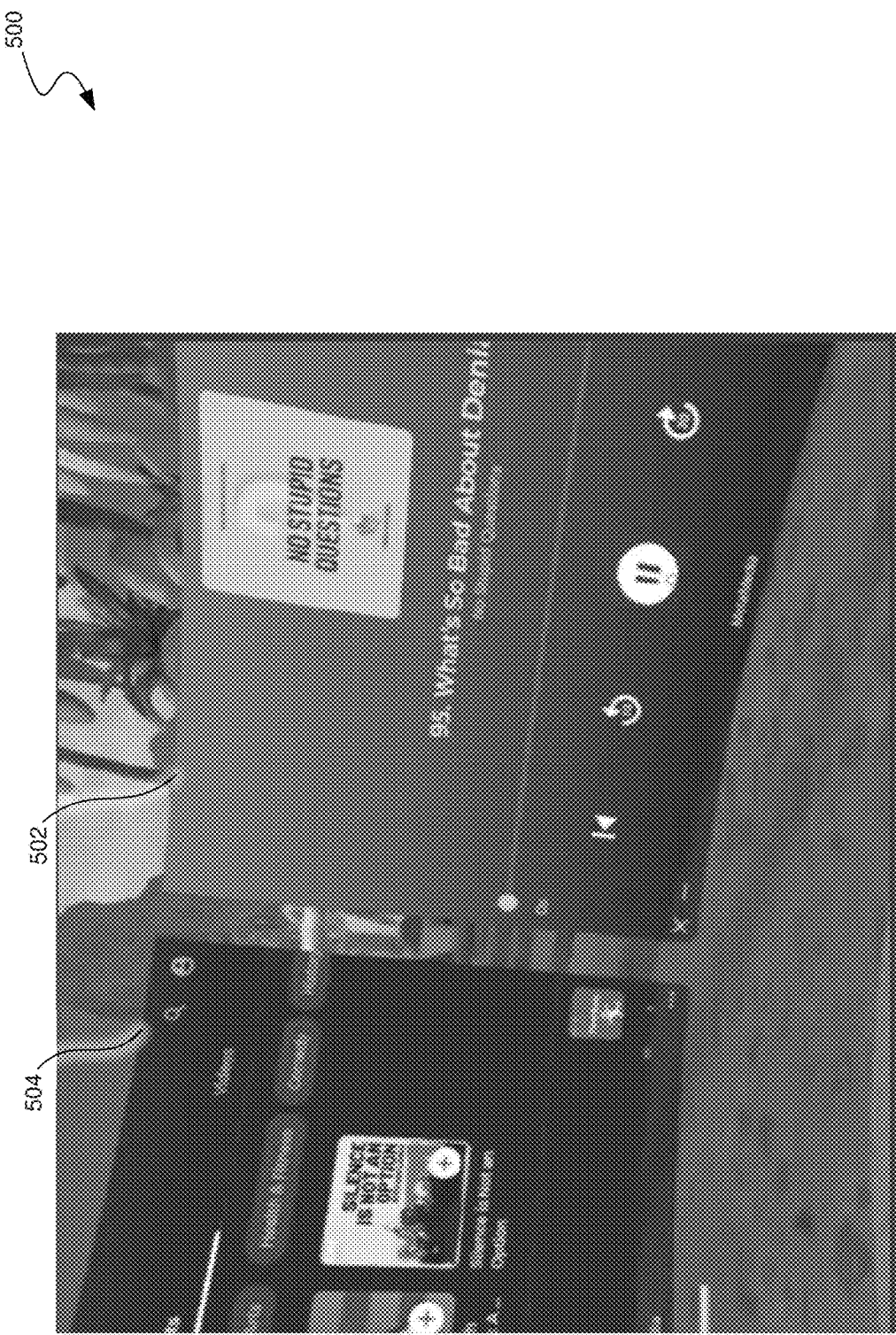
FIG. 5 is a diagram of an artificial reality environment that includes two virtual objects displaying content from two executing applications.

Implementations of a shell environment for a XR system can receive content from application(s) executing at the XR system and display corresponding virtual objects that host the received content. FIG. 5 is a diagram of an artificial reality environment that includes two virtual objects displaying content from two executing applications. XR environment 500 includes virtual object 502 and virtual object 504.

In some implementations, XR environment 500 can be a three-dimensional shell environment for a shell application executing at a XR system. XR environment 500 (and the shell application) can operate in a mode the permits display of multiple virtual objects for concurrently executing applications (that are separate from the shell application). For example, virtual objects 502 and 504 can be two-dimensional virtual objects (e.g., panels) that each correspond to a different executing application. For example, virtual objects 502 and 504 can each display content provided by an executing application.

In some implementations, a user can interact with virtual objects 502 and/or 504 via one or more XR system interactions. For example, a ray cast from the user's virtual presence (e.g., avatar) can intersect with portions of virtual objects 502 and/or 504. In another example, virtual user hands (controlled via tracked user hand motion) can collide with portions of virtual objects 502 and/or 504. In another example, a user can manipulate a XR system hand-held controller to drive a cursor at virtual objects 502 and/or 504. User interactions can also include event interactions, such as gestures (e.g., pinch gesture, push gesture), controller button presses, and the like.

In some implementations, the shell environment can receive XR user interactions relative to virtual object 502 and translate the interaction into input for the executing application that corresponds to virtual object 502. For example, the user interaction can comprise selecting a button at virtual object 502 (e.g., via driving a cursor, selecting via a ray cast from the user's virtual presence, tracked hand movement, etc.) and performing a button push gesture (e.g., back and forth gesture of the user's hand). The shell environment can translate the user interaction into a button press event at the cursor location, and the executing application can receive this translation and perform application functionality in response (e.g., the functionality triggered by the button press).

Example executing applications include web browsers, music players, video players, social media applications, messaging web browsers, music players, video players, social media applications, messaging or other communication applications, third-party applications, streaming/casting applications, a content library application, or any other suitable application. Example application functionality in response to the translated input can include playing audio (e.g., music) or video, launching a webpage, sending a social media message, and the like.

Figure 6:
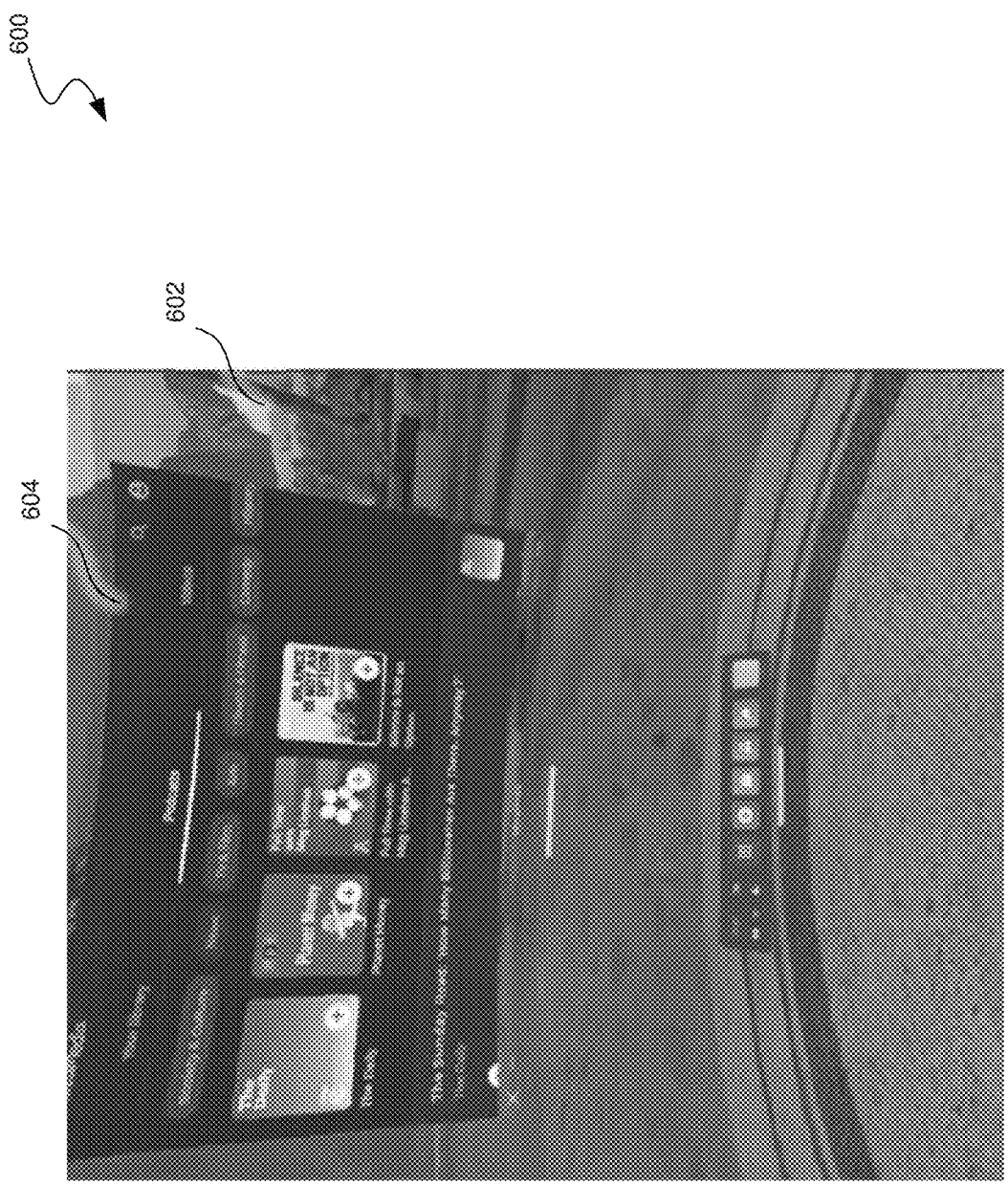
FIG. 6 is a diagram of an artificial reality environment that includes a two-dimensional virtual object and modifiable background.

FIG. 6 is a diagram of an artificial reality environment that includes a two-dimensional virtual object and modifiable XR environment. XR environment 600 includes background 602 and virtual object 604. XR environment 600 can be a shell XR environment with components that can be modified by the executing application that corresponds to virtual object 604. For example, virtual object 604 can display content for an executing application (e.g., application separate from the shell application). In some implementations, the executing application can communicate with the shell environment (e.g., via an application programming interface (API)) to modify one or more of a sky box, background, lighting, and/or any other suitable component of the shell XR environment. For example, background 602 can be modified by an API call from the executing application that corresponds to virtual object 604 to the shell environment.

Figure 7:
FIG. 7 is a diagram of an artificial reality environment that includes a two-dimensional virtual object and an associated three-dimensional virtual object.

FIG. 7 is a diagram of an artificial reality environment that includes a two-dimensional virtual object and an associated three-dimensional virtual object. XR environment 700 includes virtual object 702 and three-dimensional virtual object 704. XR environment 700 can be a shell XR environment that receives three-dimensional object data and, in response, displays three-dimensional virtual object 704. For example, virtual object 702 can display content for an application executing at a XR system. The executing application can communicate with the shell environment (e.g., via an API) and provide the three-dimensional data that triggers this display of three-dimensional virtual object 704. The data can include structural data (e.g., a mesh model, a 3D model, etc.), location information relative to virtual object 702 (e.g., coordinates that define a location on the panel, distance from the panel, etc.), and other suitable data for three-dimensional virtual object 704.

In some implementations, the shell environment can receive user interactions with three-dimensional virtual object 704 and translate the user interactions into user input for the executing application. For example, the user interaction can grab three-dimensional virtual object 704, and the shell environment can translate the user grab interaction into a selection of a component of virtual object 704 (e.g., button, menu item, etc.). Other suitable user interactions with three-dimensional virtual object 704 include touching, poking, spinning, pushing, pulling, and the like, and the shell environment can translate such user interactions into any user input suitable to trigger functionality at the executing application (e.g., button press, menu item selection, scroll event, other suitable user interface component selection, etc.).

Figure 8:
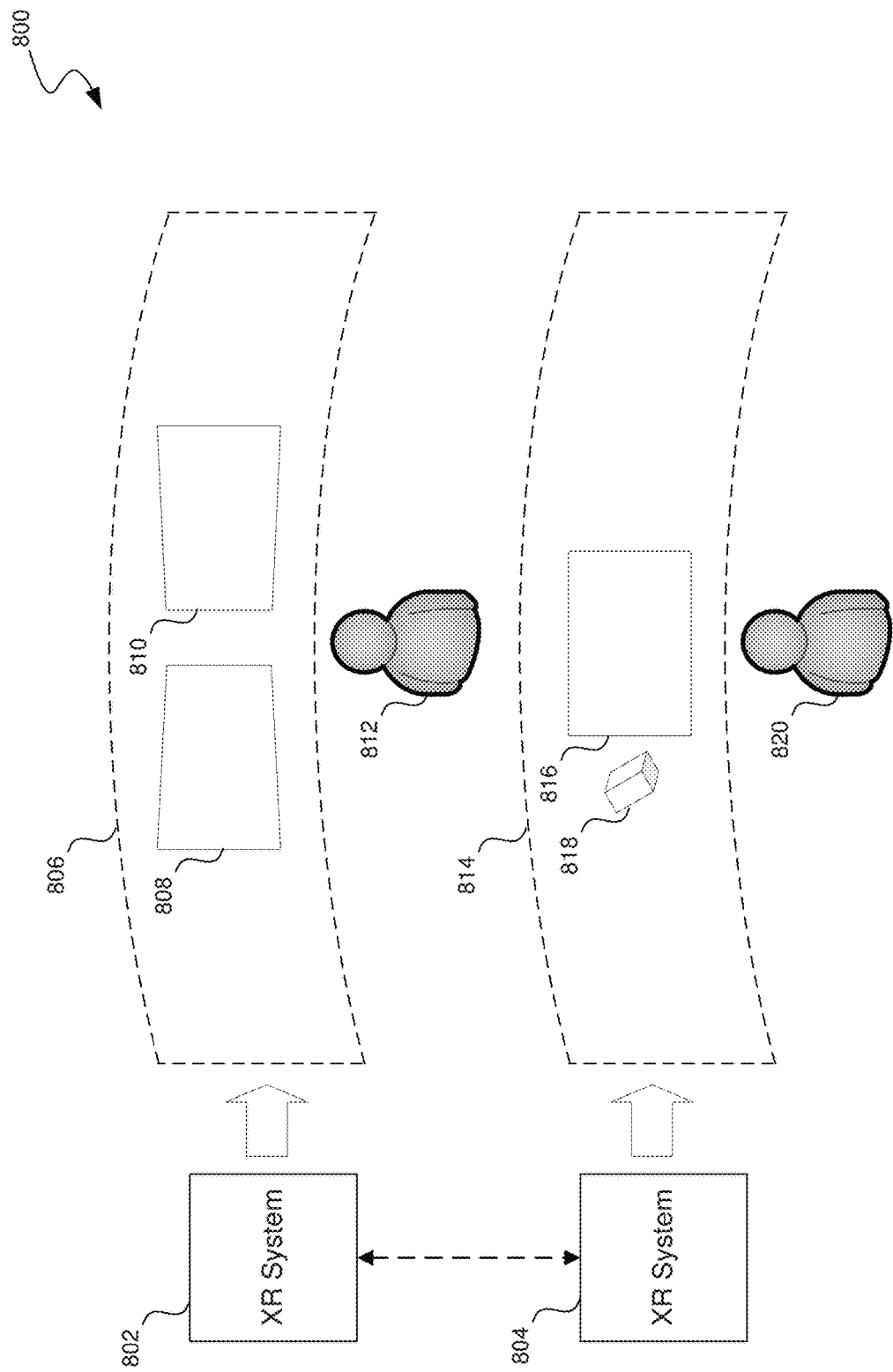
FIG. 8 is a diagram of a host XR system, remote XR system, and three-dimensional system shell environments with multiple virtual object displays.

Some implementations stream remote content from a host XR system to a remote XR system. For example, the remote content can be provided by an application executing at the host XR system, and the streamed content can be hosted by a virtual object displayed at the remote XR system. FIG. 8 is a diagram of a host XR system, remote XR system, and three-dimensional system shell environments with multiple virtual object displays. Diagram 800 includes XR system 802, XR system 804, environment 806, virtual objects 808 and 810, user 812, environment 814, virtual object 816, three-dimensional virtual object 818, and user 820.

XR system 802 can be a host XR system that displays environment 806, such as a three-dimensional XR shell environment. XR system 802 can display environment 806 to user 812, which can be a virtual presence of a user (e.g., avatar). Environment 806 can include virtual objects 808 and 810. In some implementations, a single application executing at XR system 802 can provide content for both virtual objects 808 and 810. For example, virtual object 808 can display host content from the executing application, and virtual object 810 can be a representation virtual object that displays remote content from the executing application.

XR system 804 can be a remote XR system that displays environment 814, such as a three-dimensional XR shell environment. XR system 804 can display environment 814 to user 820, which can be a virtual presence of a user (e.g., avatar). Environment 814 can include virtual object 816 and three-dimensional virtual object 818. In some implementations, a content displayed by virtual object 816 can be the remote content provided by the application executing at XR system 802.

For example, the application executing at XR system 802 can generate two versions of content. The first version can be a host version for virtual object 808 displayed by XR system 802, and the second version can be a remote version for virtual object 816 displayed by XR system 804. XR system 802 can stream the remote content generated by the executing application to XR system 804. The shell environment of XR system 804 can map the remote content to virtual object 816.

In some implementations, the remote content can include three-dimensional data that triggers display of three-dimensional virtual object 818 proximate to virtual object 816. Three-dimensional virtual object 818 can be similar to three-dimensional virtual object 704 of FIG. 7. One or more three-dimensional virtual objects (not depicted) can also be displayed relative to virtual objects 808 and 810 by XR system 802.

In some implementations, the application executing at XR system 802 can be a presentation application. For example, a presenter can be provided presentation controls for progressing through the presentation while viewers of the presentation are provided the presentation content. The first version of content for virtual object 808 (e.g., host content) can include content for the presenter, such as presentation content, presenter notes, controls for progressing the presentation, and the like. The second version of content for virtual object 816 (e.g., remote content) can include presentation content (e.g., slides, videos, images, text, audio from the presenter, etc.) but excludes the presenter notes and controls for progressing through the presentation. In some implementations, virtual object 810 can display the remote content streamed to XR system 804 (and displayed at virtual object 816). For example, the remote content generated by the executing application can be streamed to XR system 804 and displayed at virtual object 810. In this example, the presenter (e.g., user 812) is displayed both versions of the content.

In some implementations, user 820 can provide input at XR system 804 relative to virtual object 816. For example, a shell environment at XR system 804 can translate the input into coordinates relative to virtual object 816 and an event (e.g., gesture for zooming in and/or zooming out). XR system 804 can transmit this translated input to XR system 802 and the executing application. The executing application, in response, can perform application functionality. For example, the input may cause the application to zoom in on a portion of the remote content. XR system 802 can stream the altered remote content to XR system 804 and virtual object 816, which can display the altered remote content (e.g., zoomed-in content). In this example, because virtual object 810 displayed at XR system 802 to user 812 mirrors the remote content displayed at virtual object 816, user 812 (e.g., the presenter) is able to see that user 820 zoomed-in on a portion of the presentation content. With this information, user 812 can respond to this action when progressing through the presentation.

Those skilled in the art will appreciate that the components illustrated in FIGS. 1-8 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 9:
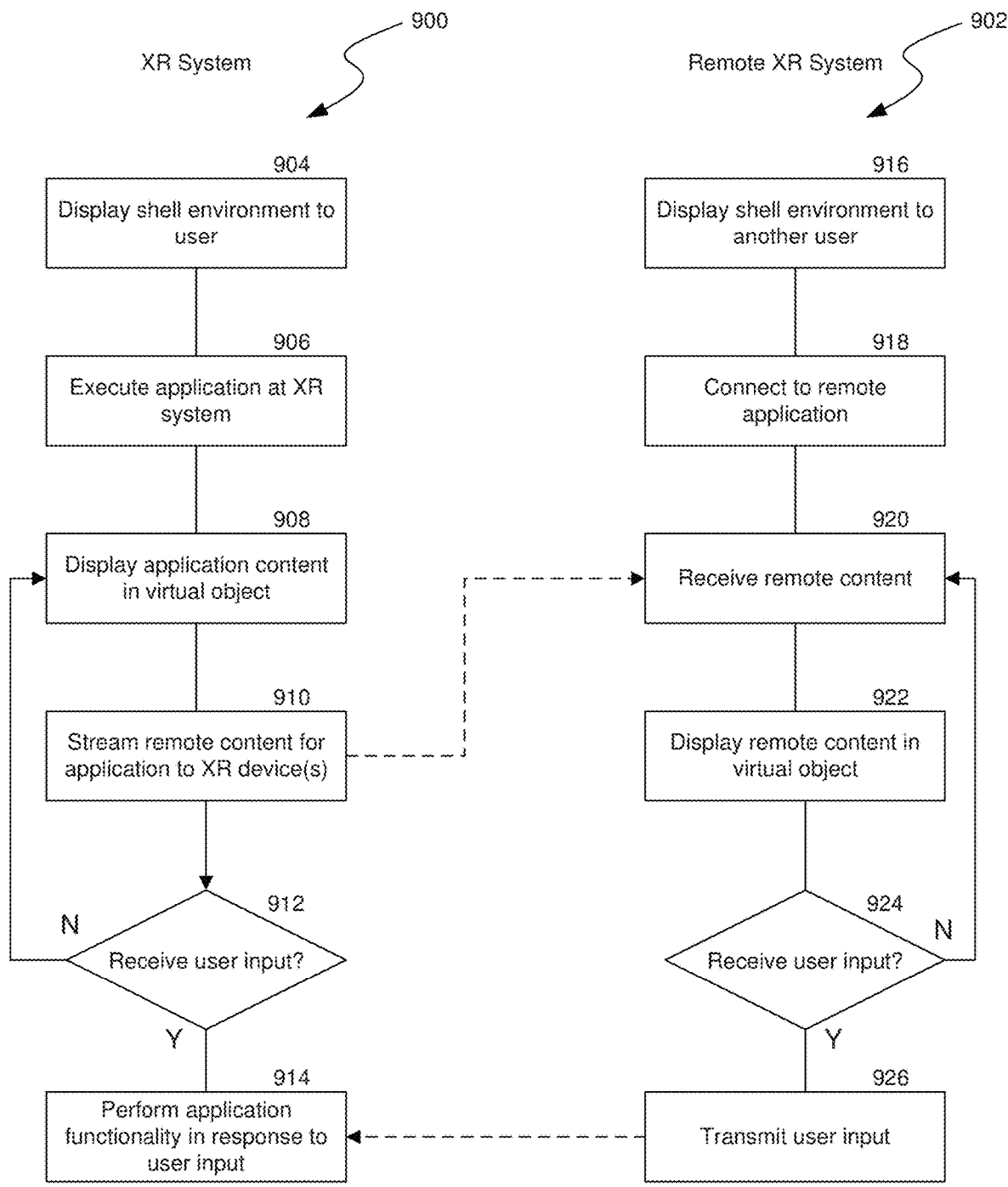
FIG. 9 is a flow diagram illustrating a process used in some implementations of the present technology for streaming interactive content from a native application executing at an artificial reality device to nearby artificial reality device(s).

FIG. 9 is a flow diagram illustrating a process used in some implementations of the present technology for streaming interactive content from a native application executing at an artificial reality device to nearby artificial reality device(s). Process 900 can be performed by a host XR system and process 902 can be performed by a remote XR system. In some implementations, processes 900 and 902 can be triggered in response to launching an application at the host XR system, a connection between the host XR system and the remote XR system, or any other suitable trigger.

At block 904, process 900 can display a shell environment to a user. For example, the host XR system includes a shell environment that manages the software components of the XR system. In some implementations, the shell environment includes a shell application. The shell environment can also include a three-dimensional shell XR environment displayed (via a HMD) to the user of the host XR system.

At block 906, process 900 can execute an application at the host XR system. For example, the host XR system can execute one or more additional applications that are separate from the shell application. Example additional applications include web browsers, music players, video players, social media applications, messaging web browsers, music players, video players, social media applications, messaging or other communication applications, third-party applications, streaming/casting applications, a content library application, or any other suitable application.

At block 908, process 900 can display application content from the executing application in a virtual object displayed at the host XR system. For example, an executing application at the host XR system can include a display component that is a two-dimensional virtual object (e.g., panel). The two-dimensional virtual object can be displayed in a region of the shell XR environment, such as a near-field region that is a first distance from the user's virtual representation (e.g., avatar). In some implementations, the application executing at the host XR system is separate from the shell application, the shell application manages a position of the virtual object within in the shell XR environment, and the executing application provides the content displayed at the virtual object.

At block 910, process 900 can stream remote content from the executing application to a remote XR system. For example, the executing application can provide two versions of content, a host version of content for the virtual object at the host XR system and a remote version of content for a remote XR system. The host version of the content can differ from the remote version of the content.

At block 912, process 900 can determine whether input is received from the user of the host XR system relative to the displayed virtual object. For example, the shell environment can receive XR user interactions relative to the virtual object and translate the interaction into input for the executing application. An example user interaction includes driving a cursor to a button at the executing application's virtual object and performing a button push gesture (e.g., back and forth gesture of the user's hand). The shell environment can translate the user interaction into a button press event at the cursor location.

When input is received from the user, process 900 can progress to block 914. When input is not received from the user, process 900 can loop back to block 908. For example, application content from the executing application can continue to be displayed by the virtual object, and remote content can continue to be streamed to the remote XR system, until user input is detected at block 912.

At block 914, process 900 can perform functionality for the application executing at the host XR system in response to the input. For example, the executing application can receive input translated by the shell environment and perform application functionality in response (e.g., the functionality triggered by the press of a selected button). In some implementations, the application functionality alters the version of application content hosted at the two-dimensional virtual object, the remote version of the application content, or both.

In some implementations, process 902 can be performed in combination with process 900. At block 916, process 902 can display a shell environment to an other user. For example, the remote XR system includes an other shell environment that manages the software components of the XR system. In some implementations, the other shell environment includes an other shell application. The other shell environment can also include an other three-dimensional shell XR environment displayed (via a HMD) to an other user of the remote XR system.

At block 918, process 902 can connect to the application executing at the host XR system. The remote XR system can connect to the host XR system via any suitable connection protocol. For example, the host XR system and remote XR system can connect via a wireless network, a wireless device to device connection, or any other suitable connection. In some implementations, the connection can support streaming remote content from the host XR system at the remote XR system. In some implementations, the host XR system and remote XR system are collocated in a physical space. For example, the user, the other user, the XR device, and other XR device can be co-located in a physical room. In some implementations, the host XR system can connect to the remote XR system via any suitable connection protocol.

At block 920, process 902 can receive remote content from the application executing at the host XR system. For example, via the connection between the host XR system and remote XR system, a remote version of content provided by the executing application can be streamed to the remote XR system. The remote version of content can include web content, images, video, audio, text, and any other suitable content for a two-dimensional virtual object.

At block 922, process 902 can display the remote content from the executing application in an other virtual object displayed at the remote XR system. For example, the remote content streamed to the remote XR system can be hosted at an other two-dimensional virtual object displayed in the other shell XR environment. In some implementations, the XR environment and the other XR environment comprise a shared XR environment that includes a virtual presence for the user and a virtual presence for the other user.

At block 924, process 902 can determine whether input is received from the other user of the remote XR system relative to the displayed other virtual object. For example, the other shell environment can receive XR user interactions (e.g., from the other user) relative to the other virtual object and translate the interaction into input for the executing application at the host XR system. The user interaction can comprise driving a cursor to a location of the other virtual object that displays the remote content from the executing application and performing a hand gesture (e.g., pinch gesture). The shell environment can translate the user interaction into predefined event action (e.g., zoom-in) at the coordinates of the cursor.

When input is received from the other user, process 902 can progress to block 926. When input is not received from the other user, process 900 can loop back to block 920. For example, remote content can continue to be received and displayed by the other virtual object until user input is detected at block 924.

At block 926, process 902 can transmit the user input to the host XR system. For example, the remote XR system can transmit, via the connection, the user input translated by the other shell environment to the host XR system.

Block 926 of process 902 can progress to block 914 of process 900, where process 900 can perform functionality for the application executing at the host XR system in response to the translated input transmitted from the remote XR system. For example, the executing application can receive input translated by the other shell environment and perform application functionality in response (e.g., zooming in to the coordinates of the remote content). In some implementations, the application functionality alters the version of application content hosted at the two-dimensional virtual object, the remote version of the application content, or both.

Figure 10:
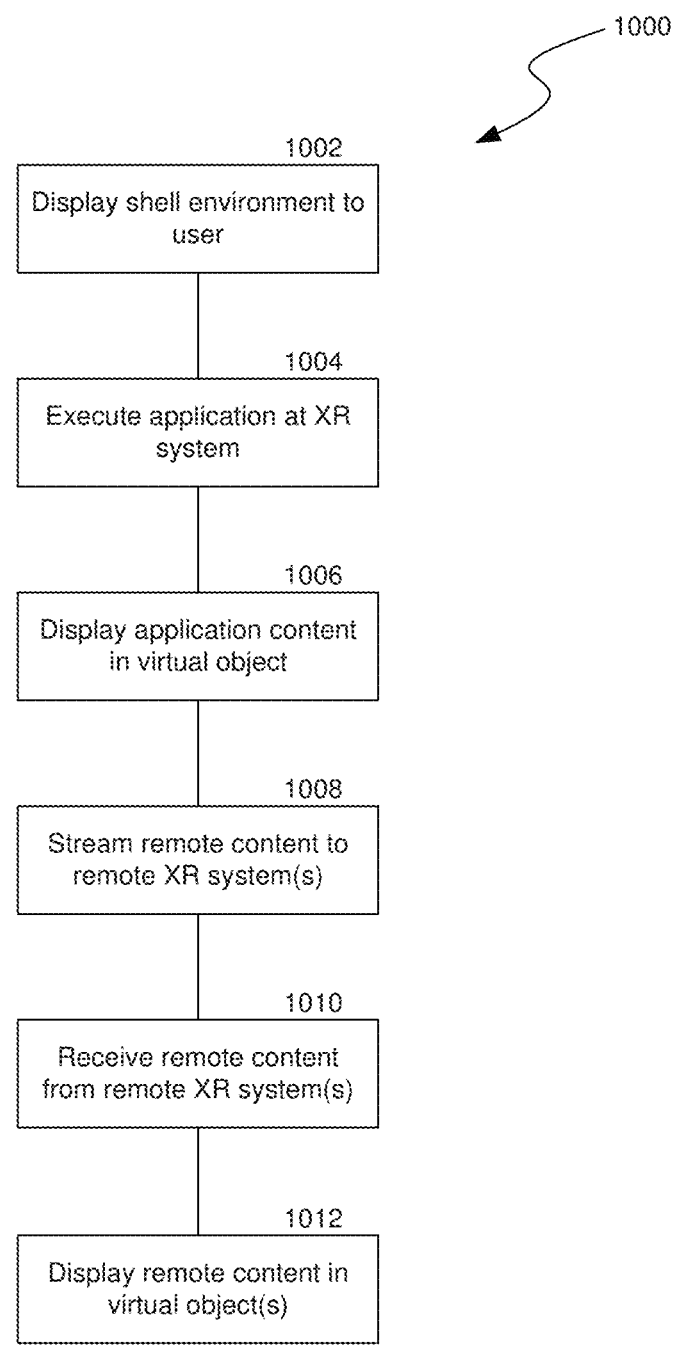
FIG. 10 is a flow diagram illustrating a process used in some implementations of the present technology for streaming content from native applications executing at artificial reality devices that display virtual objects that host the streaming content.

FIG. 10 is a flow diagram illustrating a process used in some implementations of the present technology for streaming content from native applications executing at artificial reality devices that display virtual objects that host the streaming content. Process 1000 can be performed by a XR system. In some implementations, processes 1000 can be triggered in response to launching an application at the XR system, a connection between the XR system and one or more remote XR systems, or any other suitable trigger.

At block 1002, process 1000 can display a shell environment to a user. For example, the XR system includes a shell environment that manages the software components of the XR system. In some implementations, the shell environment includes a shell application. The shell environment can also include a three-dimensional shell XR environment displayed (via a HMD) to the user of the XR system.

At block 1004, process 1000 can execute an application at the XR system. For example, the XR system can execute one or more applications that are separate from the shell application. Example applications include web browsers, music players, video players, social media applications, messaging web browsers, music players, video players, social media applications, messaging or other communication applications, third-party applications, streaming/casting applications, a content library application, or any other suitable application.

At block 1006, process 1000 can display application content from the executing application in a virtual object displayed at the XR system. For example, an executing application at the XR system can include a display component at the shell XR environment that is a two-dimensional virtual object (e.g., panel). The two-dimensional virtual object can be displayed in a region of the shell XR environment, such as a near-field region that is a first distance from the user's virtual representation (e.g., avatar). In some implementations, the application executing at the XR system is remote from the shell application, the shell application manages a position of the virtual object within in the shell XR environment, and the executing application provides the content displayed at the virtual object.

At block 1008, process 1000 can stream remote content to the remote XR system(s). For example, the XR system can establish wireless connection(s) with one or more remote XR systems. The XR system can connect to the remote XR system(s) via any suitable connection protocol. For example, the XR system and remote XR system(s) can connect via a wireless network, a wireless device to device connection, or any other suitable connection. In some implementations, the connection(s) can support streaming remote content from the XR system to the remote XR system(s) and/or streaming remote content from the remote XR system(s) to the XR system. In some implementations, the XR system and remote XR system(s) are collocated in a physical space. In some implementations, any of the XR system or remote XR system(s) can establish the connections(s) via any suitable connection protocol.

Remote version(s) of content can be provided by the application executing at the XR system. For example, the executing application can provide multiple versions of content, a host version of content for the virtual object at the XR system and multiple remote versions of content for the remote XR system(s). For example, one, two, or more remote versions of the content can be generated and streamed, over the relevant established connection(s), to each of the remote XR system(s). The remote version(s) of the content can be different from one another, different from the host version of the content, or any combination thereof. In some implementations, the remote XR system(s) can each display a shell XR environment to a user that includes a two-dimensional virtual object, and each two-dimensional virtual object can display the remote version of the content streamed to the remote XR system.

At block 1010, process 1000 can receive remote content from remote XR system(s). For example, one, two, or more remote XR systems can include executing applications (e.g., natively executing at each remote XR system) that each generate one or more remote versions of application content. Different streams of remote content can be received at the XR system from the remote XR system(s), for example over the relevant established connection(s).

At block 1012, process 1000 can display the received remote content in virtual object(s). For example, each received stream of remote content can correspond to a different two-dimensional virtual object displayed in the shell XR environment at the XR system. The virtual object(s) that display remote version(s) of content can be displayed alongside the virtual object that displays the host version of content provided by the application executing at the XR system.

In some implementations, the application(s) executing at the XR system and the remote XR system(s) can be a same native application. Accordingly, the virtual objects that display the host version of content provided by the application executing at XR system and the remote version(s) of content received as streaming content can represent the same application executing at different XR systems. For example, each virtual object that displays a remote version of content can represent a view of the same application's state that is executing at each of the remote system(s).

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for streaming interactive content from a native application executing at an artificial reality (XR) device to one or more nearby artificial reality devices, the method comprising:

displaying, to a user via a XR device, a XR environment and a two-dimensional virtual object within the XR environment, wherein the XR environment is provided by a shell application executing at the XR device and content hosted by the two-dimensional virtual object within the XR environment is provided by an additional application executing at the XR device, the shell application being separate from the additional application;

streaming, to an other XR device, remote content from the additional application executing at the XR device, wherein the other XR device:

in response to the streaming displays, in an other XR environment, an other two-dimensional virtual object that hosts the remote content, wherein the XR device and other XR device are co-located in a physical space; and receives and processes input, from an other user of the other XR device, relative to the other two-dimensional virtual object, wherein the processed input is transmitted from the other XR device to the XR device; and performing functionality for the additional application executing at the XR device in response to the transmitted input, wherein the functionality alters the content hosted at the two-dimensional virtual object, a version of the remote content hosted at the other two-dimensional virtual object, or both.

2. The method of claim 1, wherein the additional application executing at the XR device streams data for a three-dimensional virtual object to the other XR device, and wherein, in response to the streamed data for the three-dimensional virtual object, the other XR device displays an other three-dimensional virtual object within the other XR environment, the other three-dimensional virtual object being associated with the other two-dimensional virtual object.

3. The method of claim 2,
- wherein the other XR device receives and processes additional input relative to the other three-dimensional virtual object, wherein the additional input is translated into input for the additional application executing at the XR device, and the translated input is transmitted from the other XR device to the XR device; and
- wherein additional functionality for the additional application executing at the XR device is performed in response to the translated input, the additional functionality altering the version of the remote content hosted at the other two-dimensional virtual object, the other three-dimensional virtual object, or both.

4. The method of claim 3, wherein an other shell application at the other XR device manages the other two-dimensional virtual object and the other three-dimensional virtual object, and the other shell application translates the additional input into the translated input, the translated input comprising input relative to the other two-dimensional virtual object.

5. The method of claim 1, wherein the user, the other user, the XR device, and other XR device are co-located in a physical room.

6. The method of claim 1, wherein the XR environment and the other XR environment comprise a shared XR environment that includes a virtual presence for the user and a virtual presence for the other user.

7. The method of claim 1, further comprising:
- displaying, to the user via the XR device, a representation two-dimensional virtual object within the XR environment that displays the remote content from the additional application executing at the XR device that is streamed to the other XR device.

8. The method of claim 7,
- wherein the shell application receives and processes next input, from the user of the XR device, relative to the two-dimensional virtual object, and performs functionality for the additional application executing at the XR device in response to the next input, and
- wherein the shell application does not permit the user of the XR device to provide input relative to the representation two-dimensional virtual object.

9. The method of claim 7, wherein the content from the additional application executing at the XR device hosted at the two-dimensional virtual object differs from the remote content.

10. The method of claim 1,
- wherein the shell application manages a position of the virtual object within in the XR environment, and the additional application executing at the XR device provides the content displayed at the virtual object, and
- wherein the other XR environment is provided by an other shell application executing at the other XR device, the other shell application manages a position of the other virtual object within the other XR environment, and the additional application executing at the XR device provides the remote content streamed to the other XR device and displayed at the other virtual object.

11. The method of claim 10,
- wherein the shell application manages user input relative to the virtual object received via the XR device and translates the user input for the additional application executing at the XR device, and
- wherein the additional application executing at the XR device performs application functionality in response to the translated user input and alters the content displayed at the virtual object.

12. The method of claim 10, wherein the other shell application manages the input received from the other user of the other XR device and translates the input for the additional application executing at the XR device, the translated input comprising the input transmitted from the other XR device to the XR device.

13. A non-transitory computer-readable storage medium storing instructions that, when executed by a computing system, cause the computing system to perform a process for streaming interactive content from a native application executing at an artificial reality (XR) device to one or more nearby artificial reality devices, the process comprising:
- displaying, to a user via a XR device, a XR environment and a virtual object, wherein a shell application executing at the XR device provides the XR environment and an additional application, separate from the shell application, executing at the XR device provides the content for the virtual object;
- streaming, to an other XR device, remote content from the additional application, wherein the other XR device:
  - in response to the streaming displays, in an other XR environment, an other virtual object that hosts the remote content; and
  - receives and processes input relative to the other virtual object, wherein the processed input is transmitted from the other XR device to the XR device; and
- performing functionality for the additional application in response to the transmitted input, the functionality altering the content hosted at the virtual object, a version of the remote content, or both.

14. The non-transitory computer-readable storage medium of claim 13, wherein the additional application executing at the XR device streams data for a three-dimensional virtual object to the other XR device, and wherein, in response to the streamed data for the three-dimensional virtual object, the other XR device displays an other three-dimensional virtual object within the other XR environment, the other three-dimensional virtual object being associated with the other virtual object.

15. The non-transitory computer-readable storage medium of claim 14,
- wherein the other XR device receives and processes additional input relative to the other three-dimensional virtual object, wherein the additional input is translated into input for the additional application executing at the XR device, and the translated input is transmitted from the other XR device to the XR device; and
- wherein additional functionality for the additional application executing at the XR device is performed in response to the translated input, the additional functionality altering the version of the remote content hosted at the other virtual object, the other three-dimensional virtual object, or both.

16. The non-transitory computer-readable storage medium of claim 15, wherein an other shell application at the other XR device manages the other virtual object and the other three-dimensional virtual object, and the other shell application translates the additional input into the translated input, the translated input comprising input relative to the other virtual object.

17. The non-transitory computer-readable storage medium of claim 13, wherein the user, the other user, the XR device, and other XR device are co-located in a physical room.

18. The non-transitory computer-readable storage medium of claim 13, wherein the XR environment and the other XR environment comprise a shared XR environment that includes a virtual presence for the user and a virtual presence for the other user.

19. The non-transitory computer-readable storage medium of claim 13, further comprising:

displaying, to the user via the XR device, a representation virtual object within the XR environment that displays the remote content from the additional application executing at the other XR device.

20. A computing system for streaming interactive content from a native application executing at an artificial reality device to one or more nearby artificial reality devices, the computing system comprising:

one or more processors; and one or more memories storing instructions that, when executed by the one or more processors, cause the computing system to perform a process comprising:

displaying, to a user via a XR device of the computing system, a XR environment and a virtual object, wherein a shell application executing at the XR device provides the XR environment and an additional application, separate from the shell application, executing at the XR device provides the content for the virtual object;

streaming, to an other XR device, remote content from the additional application executing at the XR device, wherein the other XR device:

in response to the streaming displays, in an other XR environment, an other virtual object that hosts the remote content, wherein the XR device and other XR device are co-located in a physical space; and receives and processes input, from an other user of the other XR device, relative to the other virtual object, wherein the processed input is transmitted from the other XR device to the XR device; and performing functionality for the additional application executing at the XR device in response to the transmitted input, wherein the functionality alters the content hosted at the virtual object, a version of the remote content hosted at the other virtual object, or both.

\* \* \* \* \*